Patented July 13, 1943

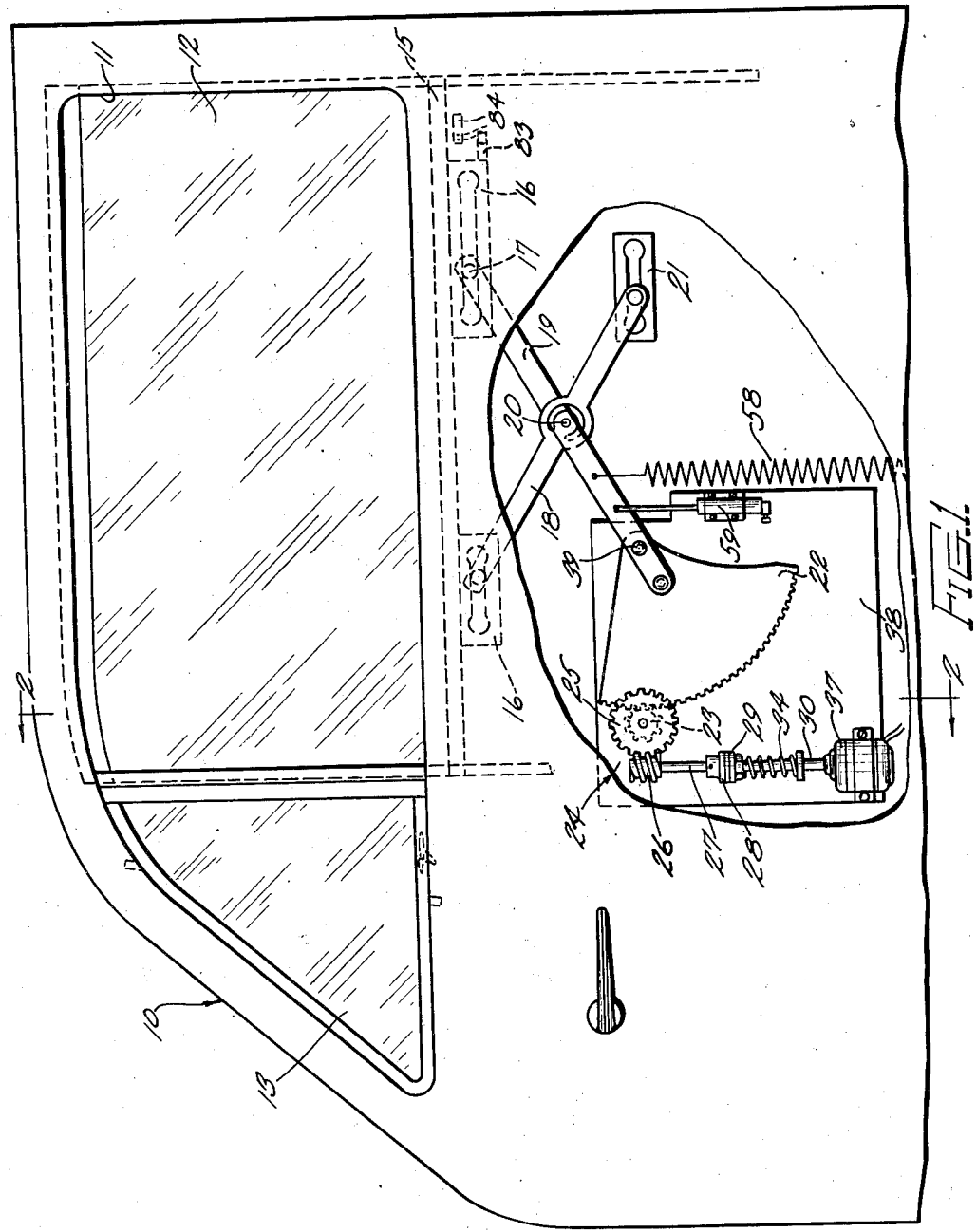

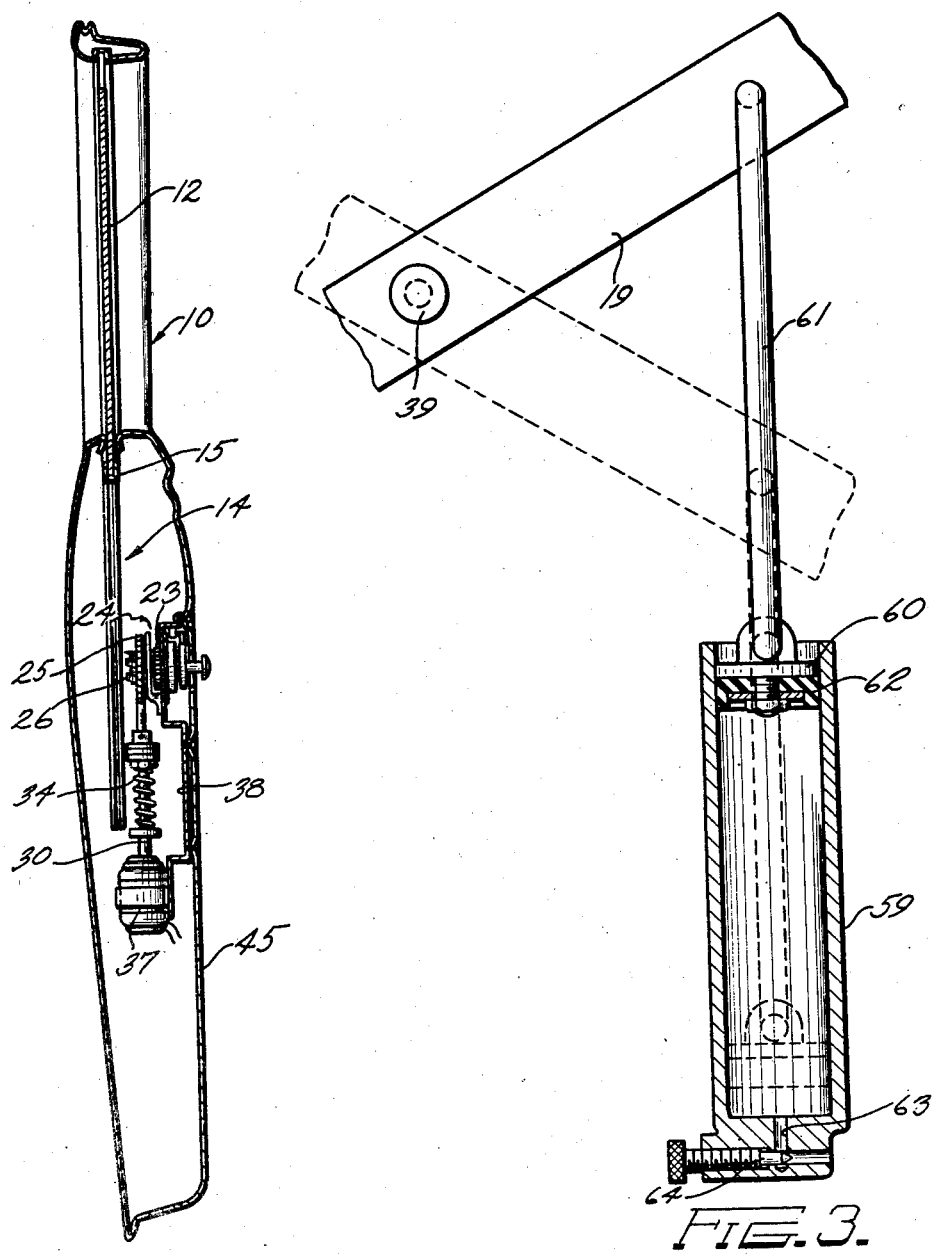

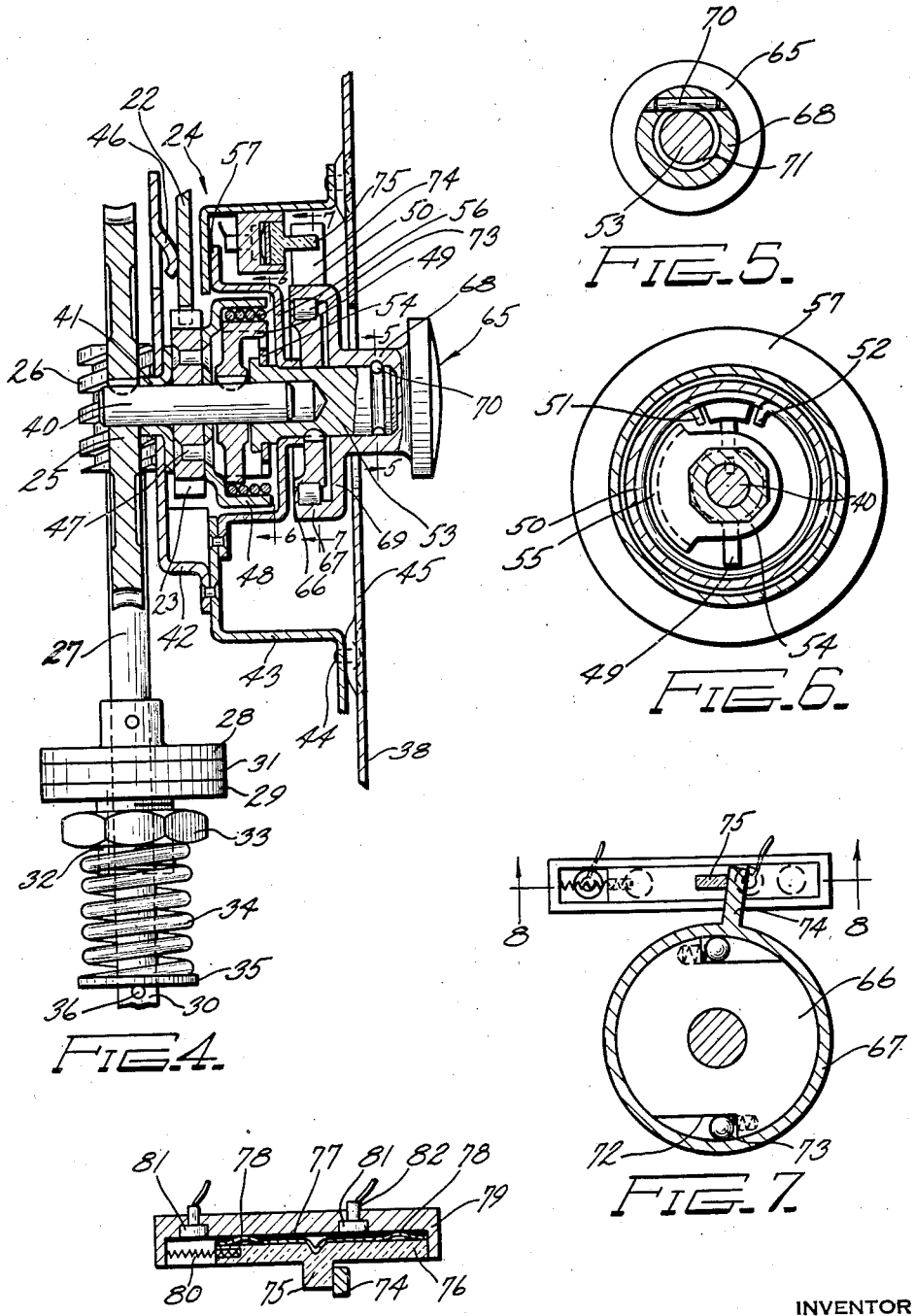

2,324,145

UNITED STATES PATENT OFFICE 2,324,145

REGULATOR MECHANISM FOR VEHICLE WINDOWS OR THE LIKE

Burton S. Floraday, Toledo, Ohio, assignor to Detroit Harvester Company, Detroit, Mich., a corporation of Michigan Application December 24, 1940, Serial No. 371,524

6 Claims. (Cl. 268—124)

This invention relates to regulator mechanisms for actuating a member to and from two stations or limits of adjustment such, for example, as a vehicle window which is movable to any desired position between fully open and fully closed positions.

An object is to produce regulator mechanism of the above character in which motor driven means functions to actuate the member in one direction and means separate from the motor driven means operates to move the member in the opposite direction, there being control means interposed between the motor driven means and the member which can be rendered ineffective to enable the said separate means to become operative.

Another object is to produce a new and improved vehicle window regulator mechanism by which the window is actuated in one direction by power means, such as an electric motor, and is actuated in the opposite direction by separate means, such as a coil spring, control mechanism being employed to retain the window in the desired position of adjustment, the same being rendered ineffective by suitable means when it is desired to actuate the window in the opposite direction.

A further object is to produce a simple and efficient vehicle window regulator mechanism by which the window may be driven in one direction by an electric motor and in the opposite direction by a coil spring, a suitable clutch or brake mechanism being releasable to disconnect the motor driven means from the window when it is desired to render effective the coil spring for actuating the window in the opposite direction.

A still further object is to produce a regulator mechanism for vehicle windows or the like having power driven means for actuating the window in one direction at the will of the operator and separate means for actuating the window in the opposite direction upon release of the power driven means and in response to a simple manipulation by the operator.

A still further object is to regulate the movement of the member, such as a vehicle window, in either direction so that the speed of movement may be controlled and damage to the motor is avoided in the event that an obstruction is encountered.

A still further object is to provide mechanism of the above character with a new and improved operating unit so that motive means is readily and conveniently energized for moving the window or other member in either direction, the same being manipulated by the operator sufficiently to cause movement to the desired position.

Other objects and advantages of the invention reside in details of construction, arrangement and operation as will hereinafter appear.

In one embodiment the invention provides regulator mechanism for a vehicle window and embodies an electric motor which is connected through means, such as a worm and wheel, for operating the window to closed position for example. The motor is energized through manipulation of a manual control, when the latter is moved in one direction. Operative connection is established through a wire clutch or brake, and upon de-energizing of the motor the worm and wheel act as a lock to retain the window in position of adjustment. A coil spring is so arranged that when the window is operated by the motor, the spring is gradually placed under tension, so that upon disconnecting the motor drive, the spring operates to move the window in the opposite direction. Such disconnection is accomplished by manipulation of the manual control in the opposite direction which releases the wire clutch so that the regulator parts directly connected to the window are free to actuate under the influence of the coil spring. A dash pot is arranged to regulate the spring impelled movement.

For purposes of illustration but not of limitation, an embodiment of the invention is shown in the accompanying drawings in which Figure 1 is a side elevation of an automobile door, parts being broken away to show the window regulator mechanism and associated parts;

Figure 2 is a vertical sectional elevation substantially on the line 2—2 of Figure 1;

Figure 3 is an enlarged vertical sectional elevation of the dash pot and a portion of the regulator arm to which it is linked;

Figure 4 is an enlarged vertical sectional view of the driving mechanism by which the motor is connected to the regulator arms, the control knob and associated parts;

Figure 5 is a transverse sectional view on the line 5—5 of Figure 4;

Figure 6 is a transverse sectional view on the line 6—6 of Figure 4;

Figure 7 is a transverse sectional view on the line 7—7 of Figure 4; and

Figure 8 is a longitudinal sectional view of the switch unit taken substantially on the line 8—8 of Figure 7.

Automatic regulator mechanisms for vehicle windows which have heretofore been in use have been somewhat objectionable due particularly to the excessive load imposed upon the battery.

The amount of current required to drive the window in both directions has imposed a serious strain on the battery and as a consequence, it is desired to reduce that load as much as possible and to produce a window regulator which is driven in one direction by a relatively small electric motor but is actuated in the opposite direction by means other than the motor. It is therefore a desideratum to produce a regulator which is automatic in operation, relatively inexpensive, and reduces the current required in its operation.

In the drawings, the automobile door 10 has a window opening 11 in which a window glass or panel 12 is slidable vertically in the usual manner between open and closed positions, the window glass 12 being movable in and out of a well 14 arranged below the opening 11. In this instance, a pivotally mounted ventilating panel 13 is mounted forwardly of the main window glass 12. Embracing the lower edge portion of the window is a channel 15 from which depend horizontally slotted retainers 16. Buttons or studs 17 secured to the upper ends of cross arms 18 and 19 are slidable respectively longitudinally along the slots of the retainers 16. The arms 18 and 19 are pivotally connected at 20 intermediate their ends and the lower end of the arm 18 has a stud which is slidable in a horizontally disposed slot of a plate 21 suitably secured to the door. The lower end of the arm 19 is fixed to a gear sector 22, the teeth of which mesh with a pinion 23 forming a part of a clutch or control assembly 24.

As will hereinafter more fully appear the pinion 23 is driven by a worm wheel 25 which meshes with a worm 26 secured to a vertical shaft 27. On the lower end portion of the shaft 27 is secured a disc 28 which cooperates with a similar disc 29 on the motor shaft 30. Fitting the shaft 27 and interposed between the discs 28 and 29 is a friction disc 31 of fibrous material. The disc 29 is free to move longitudinally of the motor shaft and has a screw-threaded neck 32 carrying an adjusting nut 33 which provides a seat for one end of a coil spring 34, the opposite end of which seats against a washer 35 held in place by a pin 36.

It will be understood that in case the window encounters an obstruction during its movement toward closed position, imposing a relatively great strain on the motor, the disc 29 will rotate independently of the disc 28. The force necessary to cause such independent rotation of the disc 29 can be predetermined by varying the force of the spring 32 through regulation of the adjusting nut 34. The shaft 30 is driven by a relatively small electric motor 37. As indicated on Figure 2, the mechanism is disposed within the door 10 and so positioned as not to interfere with the up and down movement of the window glass 12. A supporting plate 38 provides a mounting for the clutch mechanism 24, electric motor 37 and associated parts, the gear sector 22 being pivotally connected thereto by a pin 39.

The clutch or driving mechanism 24 includes a shaft 40 to one end of which the worm wheel 25 is keyed. The shaft 40 is mounted in a bearing sleeve 41 carried by an offset plate 42 which is riveted to a cup-shaped portion 43 of the supporting plate 38. The supporting plate 38 is secured to embossed portions of the inner door panel 45 by screws 44. A tongue 46 struck out of the offset plate 42 bears against the gear sector 22 for holding it against lateral movement.

The sector engaging pinion 23 is mounted on the shaft for relative rotative movements and is fixed by rivets 47 to a cup-shaped clutch part 48. Disposed within the clutch part 48 is a clutch spider 49 and interposed between the clutch parts 48 and 49 is a contractile helical coil spring 50, the opposite ends 51 and 52 of which are inturned. The clutch spider is keyed to the shaft 40 and in normal driving relation, when the shaft 40 is rotated by the worm wheel 25 the spider 49 engages the spring end 52 upon clockwise rotation of the spider 49 as viewed in Figure 6. This tends to unwind the spring 50 and thereby expand it into clutching engagement with the cup 48. In this manner the pinion 23 is driven to actuate the sector 22 which in turn swings the regulator arms 19 and 18 to impart upward or closing movement to the window glass 12.

Sleeved over the opposite end of the shaft 40 is a socketed stem 53, the outer end of which projects inside of the door panel 38. Fitting over the stem and forming a bearing therefor is a cup-shaped housing 56 which encloses the clutch parts and has a flange 57 which is riveted to the supporting plate portion 43. The stem 53 is free to rotate on the shaft 40 and is provided with a squared inner end to receive the hub of the arm 54, the arm and stem 53 turning together. Projecting laterally from the outer end of the arm 54 is an arcuate flange 55 which is movable into engagement with the spring end 51 upon clockwise rotation thereof (Figure 6). Engagement of the spring end 51 by the flange 55 tends to wind up the coil spring 50 so that it moves away from the clutch part 48 and thereby freeing the pinion 23 from the electric motor and its driving connections.

From the above description it will be apparent that upon clockwise rotation (Figure 6) of the release arm 54 to wind up the helical coil spring 50 and thereby release it from clutching engagement with the clutch part 48, the sector driving pinion 23 is freed from its operative connection with the electric motor 37 as well as the worm and worm wheel drive. Although under some circumstances the weight of the window glass 12 and associated parts would be sufficient alone to cause the downward movement of the window glass upon release of the pinion 23, it is desired to facilitate or insure such downward movement and for that purpose a helical coil spring 58 has one end pivotally connected to the regulator arm 19 intermediate the pivotal mountings 20 and 39, the opposite end being anchored to a lower portion of the door, such connection not being shown.

Obviously upon the upward or closing movement of the window glass 12 the spring 58 will gradually be placed under tension or the coils thereof extended so that upon actuation of the release arm 54 as above described, the spring 58 can then be rendered effective to cause downward movement of the window glass until the flange 55 of the arm 54 is moved away from the spring end 51 to enable the spring automatically to expand into clutching engagement with the clutch part 48. Thereupon the window will be held against further movement due particularly to the worm wheel 25 and worm 26, the latter serving as a lock to militate against continued window movement and to retain it in the adjusted position.

It will be manifest that unless some control is provided for the downward movement of the window glass 12, such movement will be exceedingly abrupt with the possible result of injury or breakage of parts. For that purpose a simple dash pot is employed which can be adjusted to regulate the speed of movement to the extent desired. As shown a cylinder 59 is suitably mounted in vertically disposed position upon the supporting plate 38. Reciprocable within the cylinder 59 is a piston 60 having a piston rod or link 61 which is pivoted at one end to the piston and at the opposite end to the regulator arm 19 adjacent the point of connection of the coil spring 58. The piston 60 is provided with suitable packing 62 and the bottom end of the cylinder 59 is provided with an L-shaped passage 63 communicating respectively with the inside of the cylinder and the outside. The passage 63 is controlled by a manually adjustable valve 64.

It will be readily apparent that upon upward movement of the window glass 12 the piston 60 is drawn upwardly substantially as indicated on the full lines of Figure 3, thereby drawing in air from the outside through the passage 63. When the spring clutch is released in order to render the coil spring 58 effective, the piston 60 moves downwardly forcing the air from within the cylinder to the outside through the passage 63. By regulating the valve 64 the speed at which the window moves may be adjusted as desired.

As will hereinafter appear a single control knob 65 is disposed on the inside of the vehicle door 10 in convenient position for manipulation and upon turning the knob in one direction, the electric motor 37 is energized for moving the window glass 12 upwardly as hereinbefore described and upon turning movement in the opposite direction, the spring clutch 50 is released to enable the coil spring 58 to impart downward movement to the window glass. For this purpose, a disc 66 is keyed to the stem 53 and embracing the peripheral surface of the disc 66 is an annular flange 67 which is integrally connected to the hub portion 68 of the knob 65 by a web 69. The hub portion 68 is secured for relative turning movements to the stem 53 by a pin 70 disposed in a transverse opening in the hub 68 and engaging in an annular groove 71 formed in the stem 53. Diametrically opposed notches 72 are formed in the peripheral surface of the disc 66 to receive rollers 73 respectively. The notches 72 are so constructed that the rim 67 is free to turn in one direction but upon turning movement in the opposite direction, the rollers move to the restricted end of the notches, bind against the two parts and cause the disc 66 and the rim 67 to move together as a unit. Clutches of this type are well-known to those skilled in the art and further description is not considered necessary. It will be understood that upon movement of the knob 65 in one direction, the disc 66 will be driven thereby to cause movement of the stem 53 which in turn actuates the spring release arm 54 and thus releases the spring clutch 50. In this manner, the electric motor and its driving connections are released and the spring 58 rendered effective to move the window glass 12 downwardly.

As above mentioned rotation of the control knob 65 in the opposite direction energizes the electric motor 37 and for this purpose the rim portion 67 is provided with an integral outwardly extending finger 74 which is engageable with a lug 75 of an insulating strip 76 which carries a spring contact piece 77 on its inner side, the end portions of the spring piece 77 being outwardly bowed as indicated at 78. The strip 76 and its metallic contact piece 77 are mounted for sliding movements in a housing 79 and are normally urged to inoperative position by a coil spring 80 interposed between one end of the insulating strip 76 and the adjacent wall of the housing. The outwardly bowed contact portions 78 are adapted to engage laterally spaced contact pieces carried by the housing 79 so that when the insulating strip 76 is moved to the left of Figure 8, the outwardly bowed portions 78 contact the respective contact pieces 81. From the contact pieces 81 lead wires 82 extend for operating the motor 37. It will thus be apparent that upon movement of the knob 65 in the opposite direction, the rim portion 67 thereof will move independently of the disc 66 and the finger 74 will engage the lug 75 of the insulating strip and thereby move the strip to the position for establishing an electrical circuit for energizing the motor 37. Upon release of the knob 65 it will be manifest that the coil spring 80 will shift the insulating strip 76 thereby to break the circuit and de-energize the electric motor.

A limit switch is provided for automatically de-energizing the motor 37 when the window glass 12 has been moved to its closed position and for this purpose a contact strip 83 is carried by one of the retainers 16 and is engageable with a stationary contact strip 84 mounted on the door structure 10. The contact strip 83 will engage the contact strip 84 at the desired position of window movement, the latter being so connected in the electric circuit as to de-energize the motor when the strips 83 and 84 are brought into contact.

From the above description it will be apparent that I have provided an exceedingly simple and compact regulator mechanism by which the vehicle window can be driven through an electric motor for raising or closing the same, such operation being accomplished by a simple adjustment of a control member. By actuating the control member in a reverse direction, a separate means, in this instance a coil spring, is rendered effective to move the window in a regulated manner to open position. Although the embodiment of the invention has been described in connection with a vehicle window, it is to be understood that the invention is of broader aspect since it can be used for other purposes such, for example, as actuating a vehicle seat to a desired position, actuating an automobile top of a convertible automobile to and from raised position, and many other uses. It is therefore understood that the above is given by way of illustration and not of limitation and changes in details of construction, arrangement and application may be effected without departing from the spirit of the invention especially as defined in the appended claims.

What I claim is:

1. Vehicle window regulator mechanism comprising a swinging arm device operatively connected to an edge portion of the window and including an actuating gear, a pinion at all times in mesh with said gear, an electric motor operatively connected to drive said pinion for actuating the window in one direction, a clutch interposed between said motor and pinion, a spring connected to said regulator arm device adapted to be placed under tension upon movement of the window by said motor, means for manually releasing said clutch to enable said spring to actuate the window, said releasing means including a member accessible from the inside of the vehicle operable to release said clutch upon actuation in one direction and energize said motor upon actuation in another direction.

2. Vehicle window regulator mechanism comprising a swinging arm device operatively connected to an edge portion of the window and including an actuating gear, a pinion at all times in mesh with said gear, an electric motor operatively connected to drive said pinion for actuating the window in one direction, a clutch interposed between said motor and pinion, a spring connected to said regulator arm device adapted to be placed under tension upon movement of the window by said motor, a common control for said motor and clutch operable to energize the motor upon turning movement in one direction and release said clutch upon turning movement in the opposite direction.

3. Vehicle window regulator mechanism comprising a swinging arm device operatively connected to an edge portion of the window and including an actuating gear, a pinion at all times meshing with said gear, an electric motor operatively connected to drive said pinion for actuating the window in one direction, a clutch interposed between said motor and pinion, a spring connected to said regulator arm device adapted to be placed under tension upon movement of the window by said motor, a common control for said motor and clutch operable to energize the motor upon turning movement in one direction and release said clutch upon turning movement in the opposite direction, and means for automatically rendering said motor ineffective upon movement of the window by the motor to a predetermined position.

4. Vehicle window regulator mechanism comprising actuating means adapted to be connected to the window for moving same between open and closed positions, power means operatively connected to said actuating means for rendering the latter effective to move the window in one direction, means separate from said power means and operatively connected to said actuating means for moving the window in the opposite direction, and a common control member operable upon movement in one direction to energize said power means and operable upon movement in another direction to render said separate means operative.

5. Vehicle window regulator as claimed in claim 4, characterized in that the power means comprises an electrically operated device and the separate means comprises a coil spring.

6. Vehicle window regulator as claimed in claim 4, characterized in that the power means comprises an electrically operated device, and the separate means comprises a coil spring, a clutch interposed between said electrically operated device and said actuating means, and said common control member being operatively connected to energize said electrically operated device when moved in one direction and disengage said clutch when moved in another direction.

BURTON S. FLORADAY.